US012600671B2

(12) United States Patent
Mangel et al.

(10) Patent No.: US 12,600,671 B2
(45) Date of Patent: Apr. 14, 2026

(54) PROCESS FOR PREPARING FOAMED POLYMER-MODIFIED BITUMEN COMPOSITIONS

(71) Applicant: BASF SE, Ludwigshafen am Rhein (DE)

(72) Inventors: Timo Mangel, Ludwigshafen am Rhein (DE); Maik Schacht, Neustadt an der Weinstrasse (DE); Michael Dietzsch, Ludwigshafen am Rhein (DE); Frank Wagner, Wittlich (DE); Uwe Vagt, Ludwigshafen (DE); Susanne Schneider, Trostberg (DE); Carmen-Elena Cimpeanu, Ludwigshafen am Rhein (DE); Ekkehard Jahns, Ludwigshafen am Rhein (DE); Sophie Putzien, Trostberg (DE)

(73) Assignee: BASF SE, Ludwigshafen am Rhein (DE)

( * ) Notice: Subject to any disclaimer, the term of this patent is extended or adjusted under 35 U.S.C. 154(b) by 1083 days.

(21) Appl. No.: 17/637,065

(22) PCT Filed: Aug. 27, 2020

(86) PCT No.: PCT/EP2020/073942
§ 371 (c)(1),
(2) Date: Feb. 21, 2022

(87) PCT Pub. No.: WO2021/037961
PCT Pub. Date: Mar. 4, 2021

(65) Prior Publication Data
US 2022/0402819 A1 Dec. 22, 2022

(30) Foreign Application Priority Data
Aug. 28, 2019 (EP) .................................... 19194052

(51) Int. Cl.
*C04B 26/26* (2006.01)
*C04B 24/26* (2006.01)
(Continued)

(52) U.S. Cl.
CPC .......... *C04B 26/26* (2013.01); *C04B 24/2676* (2013.01); *C04B 38/10* (2013.01);
(Continued)

(58) Field of Classification Search
CPC ....... C08J 9/125; C08J 2395/00; C08L 95/00; C08L 53/02
See application file for complete search history.

(56) References Cited

U.S. PATENT DOCUMENTS 2,917,395 A 12/1959 Csanyi
3,803,066 A * 4/1974 Petrossi .................. C08L 95/00 524/60
(Continued)

FOREIGN PATENT DOCUMENTS

CA 1321276 C * 8/1993 ............... C08K 3/06
CN 104448865 A * 3/2015
(Continued)

OTHER PUBLICATIONS

Machine Translation of CN104448865A. Mar. 25, 2015. (Year: 2015).*
(Continued)

*Primary Examiner* — Stephen E Rieth
(74) *Attorney, Agent, or Firm* — Faegre Drinker Biddle & Reath LLP

(57) ABSTRACT

The invention relates to a process for preparing foamed polymer-modified bitumen compositions and to the use thereof for the production of asphalt. The invention also relates to foamed polymer-modified bitumen compositions obtainable by this process. Furthermore, the invention
(Continued)

relates to a process for producing an asphalt composition and to the use thereof in road applications. The process for the preparation of the foamed polymer-modified bitumen composition comprises the following steps: i) Heating and pressurizing a bitumen to obtain a hot flowing bitumen stream, ii) Injecting under pressure an aqueous polymer dispersion into the hot flowing bitumen stream obtained in step i), to obtain a pressurized flowing mixed stream of the bitumen and the aqueous polymer dispersion; iii) Expanding the flowing mixed stream, in particular to atmospheric pressure, such that the water contained in the aqueous polymer dispersion vaporizes and foams the mixed stream to obtain a foamed polymer-modified bitumen.

15 Claims, 1 Drawing Sheet

(51) Int. Cl.

| | |
|---|---|
| ***C04B 38/10*** | (2006.01) |
| ***C04B 111/00*** | (2006.01) |
| ***C08J 9/12*** | (2006.01) |
| ***C08L 95/00*** | (2006.01) |

(52) U.S. Cl.

CPC ............... *C08J 9/125* (2013.01); *C08L 95/00* (2013.01); *C04B 2111/0075* (2013.01); *C08J 2203/10* (2013.01); *C08J 2395/00* (2013.01); *C08J 2425/10* (2013.01)

(56) References Cited

U.S. PATENT DOCUMENTS

| | | | | |
|---|---|---|---|---|
| 4,145,322 | A * | 3/1979 | Maldonado | C08L 53/02 524/68 |
| 4,269,749 | A | 5/1981 | Marriott | |
| 4,692,350 | A | 9/1987 | Clarke et al. | |
| 5,002,987 | A * | 3/1991 | Schulz | C08G 65/007 524/60 |
| 5,830,925 | A | 11/1998 | Chion et al. | |
| 2001/0022919 | A1 | 9/2001 | Bruns et al. | |
| 2013/0276668 | A1 | 10/2013 | Ranka et al. | |
| 2015/0322228 | A1 | 11/2015 | Bieder et al. | |

FOREIGN PATENT DOCUMENTS

| | | | |
|---|---|---|---|
| CN | 106083177 | A | 11/2016 |
| EP | 0363603 | A2 | 4/1990 |
| EP | 1399513 | A1 | 3/2004 |
| GB | 1325916 | A | 8/1973 |
| WO | 98/35102 | A1 | 8/1998 |
| WO | 02/92694 | A1 | 11/2002 |
| WO | 2012/049651 | A1 | 4/2012 |
| WO | 2014/089712 | A1 | 6/2014 |
| WO | 2020/068955 | A1 | 4/2020 |

OTHER PUBLICATIONS

Blackley et al., High Polymer Latices, vol. 1, 1966, pp. 35.
Diederich et al., Chemie in unserer Zeit, vol. 24, 1990, pp. 135-142.
Holscher, Dispersionen synthetischer Hochpolymerer, 1969, pp. 43-111.
Houben-Weyl, Methoden der organischen Chemie , Georg-ThiemeVerlag, vol. XIV /1, 1961 pp. 411-420.
Warson, The Applications of Synthetic Resin Emulsions, 1972, 246 pages, pp. 246-278.
Anonymous: “Wax emulsion”, 2020 , XP055744369, pp. 1-2.
International Preliminary Report on Patentability received for PCT Patent Application No. PCT/EP2020/073942, mailed on Mar. 10, 2022, 17 pages.
International Search Report and Written Opinion received for PCT Patent Application No. PCT/EP2020/073942, mailed on Nov. 4, 2020, 18 pages.
Zhu et al., Polymer modification of bitumen: Advances and challenges, European Polymer Journal, vol. 54, 2014, pp. 18-38.

* cited by examiner

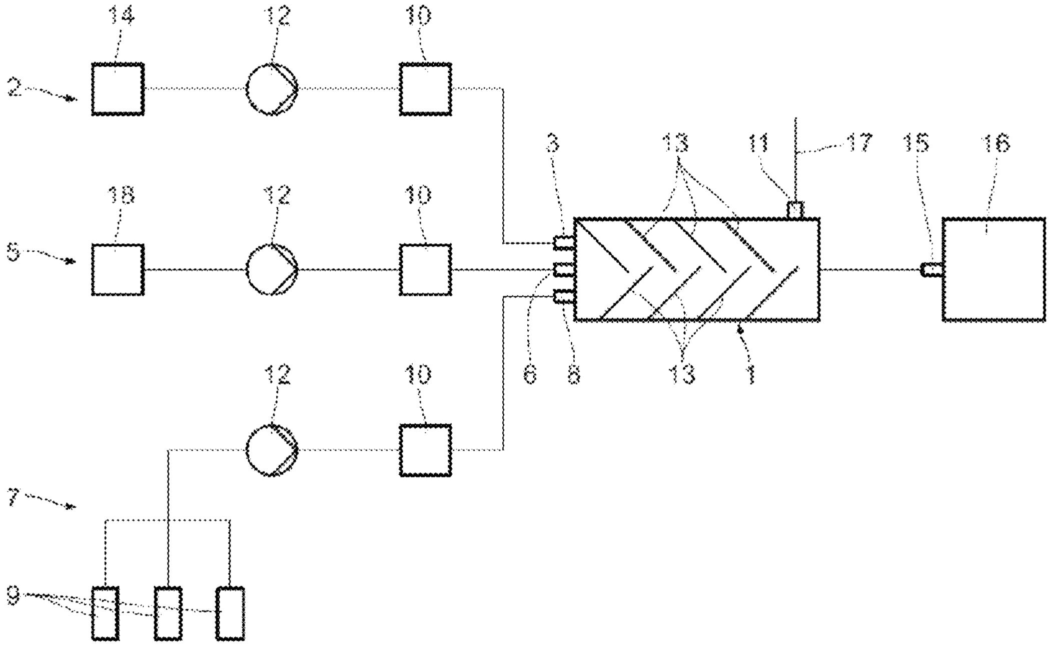
14
12
10
2
3
13
11
17
15
16
18
12
10
5
6
8
13
1
12
10
7
9

PROCESS FOR PREPARING FOAMED POLYMER-MODIFIED BITUMEN COMPOSITIONS

CROSS-REFERENCE TO RELATED APPLICATIONS

This application is a national stage application (under 35 U.S.C. § 371) of PCT/EP2020/073942, filed Aug. 27, 2020, which claims benefit of European Application No. 19194052.7, filed Aug. 28, 2019, both of which are incorporated herein by reference in their entirety.

FIELD OF THE INVENTION

The invention relates to a process for preparing foamed polymer-modified bitumen compositions and to the use thereof for the production of asphalt. The invention also relates to foamed polymer-modified bitumen compositions obtainable by this process. Furthermore, the invention relates to a process for producing an asphalt composition and to the use thereof in road applications.

BACKGROUND OF THE INVENTION

Bitumen is frequently used as a binder in road asphalt mixtures and has developed continually to meet ever-increasing performance demands of road building. Asphalt contains aggregates, i.e. a fine-grained mineral mass, in particular fine-grained rock, which are bound by the bitumen to form the asphalt. In general, bitumen performs well in road asphalt but increasingly heavy traffic loads have led to the premature wear of many roads through rutting and cracking of the surface. Cracking is a serious defect in an asphalt road because it allows water to reach lower layers of the road surface where it causes rapid deterioration and accelerates the need for premature repairs. Increasing the bitumen content of asphalt or using a softer grade of bitumen improves the crack resistance of asphalt at low temperatures but increases the risk of excessive rutting at higher temperatures because the mixture is effectively softer. Conversely, resistance of rutting can be improved by reducing the amount of bitumen in the asphalt mixture or by using a harder grade of bitumen at the expense of crack resistance because the mixture becomes less flexible.

Typically, a road surface has a three-layer structure comprising an asphalt base layer, an asphalt binder layer and an asphalt surface course. The bitumen content of the asphalt layers will depend on the kind of asphalt layer and is typically in the base layer about 5%, in the binder layer about 6% and in the surface layer about 8%. The grain size of the aggregates depends on the type of layer in a manner known per se. Between the surface layer and the binder layer and/or between the binder layer and the base layer a further layer, also termed adhesion promoter, may be present. This further layer usually has an even higher bitumen content and a finer grain size or can also be applied as a bitumen emulsion (tack coat/bond coat).

It is well known that the mechanical properties of the asphalt can be adjusted by blending the bitumen with polymers, in particular thermoplastic polymers and/or elastomers, to obtain a polymer-modified bitumen, also termed PmB. The PmB has an improved performance, in particular improved elasticity and improved thermomechanical properties, and/or improved viscoplastic and/or viscoelastic properties. A review on the polymer modification of bitumen is given by J. Zhu et al. in European Polymer Journal 54 (2014) 18-38. PmBs are typically used in the binder and surface layer, while unmodified bitumen is typically used as a binder in the asphalt base layer.

Bitumen and PmB are usually viscoelastic solids at room temperature. Therefore, they must be liquefied in the production of asphalt, in order to be efficiently mixed with aggregates. Basically, there are mainly three different processes for asphalt production, namely the hot-, warm- and cold-mix process. In the hot-mix process the asphalt is prepared by mixing molten bitumen or molten PmB with the dry aggregates so that the bitumen coats the rock grains of the aggregates with a uniform bitumen layer. In the cold-mix process the asphalt is prepared by emulsifying the bitumen in water and mixing the thus obtained emulsion with the aggregate.

The warm-mix process is an improved modification of the hot-mix process, as it allows for asphalt production at reduced temperatures. Foaming the bitumen or PmB and then mixing the foamed bitumen or PmB, also termed bitumen foam, with the aggregate represents one technological approach for enabling warm-mix asphalt production. For coating the aggregates, the bitumen foam is simply applied to the aggregates. In the foamed state, the bitumen has a volume which is about 10 to 30 times higher than the volume of the initial bitumen volume and consequently a large surface area and also a very low viscosity. Due to the low viscosity and the high volume, which is close or equal to the volume of the aggregates, foamed bitumen allows for a very efficient coating of the aggregates and for the coating process to be applied at lower temperatures. The bitumen foam can be prepared by injecting air and/or small amounts of cold water, typically in an amount of about 1 to 8 wt.-%, based on bitumen, into bitumen heated to about 110 to 200° C. and expanding the mixture into an expanding chamber. If water is used for foaming, the water evaporates explosively and forces the mixture with high pressure through an atomizer die, generating a high volume bitumen foam. The high volume foam state only lasts for a few minutes. In order to wet the aggregates efficiently the bitumen foam must have on the one hand, a sufficiently high volume or degree of expansion, respectively and on the other hand a sufficient stability. Consequently, these criteria are also employed for assessing the foam quality. The principles for the production of foamed bitumen by injecting water and suitable apparatuses for this are described e.g. in U.S. Pat. No. 4,692,350, WO 98/35102, WO 2014/089712.

U.S. Pat. No. 5,830,925 describes a process for the preparation of bitumen, wherein a bitumen mixture comprising less than 5% by weight thermoplastic rubber is blown with an oxygen containing gas.

EP 1399513 describes that the foam stability of foamed bitumen can be improved by the addition of organosilane compositions to the bitumen during the water injection step. A similar process is known from US 2013/0276668. In these processes, the organosilane acts as foam stabilizer.

CN 106083177 describes a process for producing an SMA-13 (Stone Mastic Asphalt) by a warm-mix process of a foamed PmB with a mixture of different aggregates and optionally lignin fibers.

WO 2012/049651 describes aqueous carboxylated styrene-butadiene polymer dispersions, which can be used in hot-mix asphalt formulations. The polymer modified hot-mix bitumen can be prepared by blending the bitumen and an aqueous dispersion of the copolymer at a blending temperature above the boiling point of water. For this, the aqueous polymer dispersion was added slowly in portions to the hot bitumen. After each addition, most of the bubbling was allowed to cease and thereafter, mixing was continued for at least two hours to achieve an equilibrated bitumen polymer mixture.

WO 2020/068955, which was published after the priority date of the present application, describes dispersible copolymer powders wherein the polymer particles comprise a core polymer having a glass transition temperature ($T_g$) of 40° C. or less and a shell comprising a water-soluble protective colloid polymer having a $T_g$ of 50° C. or more. Also described are asphalt compositions of such powders.

The disadvantage of the PmB-based foaming methods of prior art is that the bitumen manufacturer is not free in the type and amount of polymer used for modification of the bitumen and may also have to use an additive (stabilizing agent) to improve foam stability. Furthermore, PmB exhibits a higher viscosity as the corresponding neat bitumen, which requires raising the temperature for adequate processing. The increased temperature required for the asphalt production by using the polymer-modified bitumen leads to faster aging of the bitumen, higher energy demand and increased emissions. Furthermore, it may cause a degradation of the polymer in the bitumen, in particular, if the polymer contains ethylenically unsaturated double bonds. Moreover, PmB tends to segregate into its components at elevated temperatures.

SUMMARY OF THE INVENTION

Accordingly, it is an object of the invention to overcome these disadvantages. In particular it is an object of the invention to provide a process for preparing foamed polymer-modified bitumen, which has very good foam stability, and wherein the obtained foamed modified bitumen shows good wetting of the aggregates and excellent stability. Moreover, such preparation method should be easy, time-saving, energy-saving and allow inexpensive production of foamed modified bitumen.

These and further objectives are achieved by the process according to the invention, wherein polymer modification and the foaming of bitumen is effected in a single step by directly injecting an aqueous polymer dispersion into the apparatus for producing the foamed bitumen.

Therefore, a first aspect of the invention relates to a process for the preparation of a foamed polymer-modified bitumen composition comprising the following steps:

i) Heating and pressurizing a bitumen to obtain a hot flowing bitumen stream, ii) Injecting under pressure an aqueous polymer dispersion into the hot flowing bitumen stream obtained in step i), to obtain a pressurized flowing mixed stream of the bitumen and the aqueous polymer dispersion;

iii) Expanding the flowing mixed stream, in particular to atmospheric pressure, such that the water contained in the aqueous polymer dispersion vaporizes and foams the mixed stream to obtain a foamed polymer-modified bitumen.

The invention also relates to a foamed polymer-modified bitumen composition obtainable by the process as defined herein.

Furthermore, the invention relates to a process for producing an asphalt composition, which comprises providing a foamed bitumen composition by a process as defined herein, and mixing the foamed bitumen composition with aggregates.

A further aspect of the invention relates to the use of the foamed polymer-modified bitumen composition as defined above and below for the production of asphalt, in particular asphalt for road construction.

Moreover, the invention relates also to an asphalt composition comprising the foamed polymer-modified bitumen composition obtained by the process as defined herein, preferably in an amount of at least 3% by weight, based on the total weight of the asphalt composition.

The present invention and the particular embodiments thereof described hereinafter are advantageous with respect to one or more of the following aspects:

- The process allows for simultaneous modification and foaming of the bitumen in a single step. Therefore, the process allows for energy and time savings.
- The process allows for simultaneous use of different additives and thus allows for carrying out different modifications of the bitumen simultaneously with foaming the bitumen.
- The foamed bitumen is characterized by a high stability provided by the emulsifiers which are contained as natural byproducts in the polymer dispersion.
- The process does not require expensive mechanical mixing apparatuses for blending high viscous bitumen with polymers.
- The storage and processing temperature of the bitumen can be reduced resulting in a reduced aging rate.
- Only the amount of bitumen required for foaming needs to be modified. Thus, wastes of both bitumen and polymer can be avoided. Moreover, segregation of the polymer-modified bitumen can be avoided.
- The asphalt producer only needs storage tanks for unmodified bitumen as the polymer modification is performed on-site, directly before the asphalt mixing chamber. Further risks of cross-contamination of neat bitumen and PmB are therefore reduced.
- The asphalt mixture produced directly afterwards shows good wetting of the aggregates and excellent stability and results in an improved performance, in particular in asphalt for road construction.

DETAILED DESCRIPTION OF THE INVENTION

Here and throughout this application, bitumen is understood in accordance with DIN EN 12597:2014-08. Bitumen is a generic class of amorphous, dark-coloured, cementitious substances, natural or manufactured, composed principally of high molecular mass hydrocarbons, which are soluble in carbon disulfide. The main source is crude petroleum oil, which after refinery distillation yields a residual fraction containing bitumen. Bitumen is a colloidal system (in general a sol) wherein asphaltenes (dark, carbon-rich particles) are dispersed in an oily continuous phase (essentially composed of saturates and naphthenes) called maltenes. Due to its thermoplastic nature, water resistance and adhesion towards most other materials, bitumen is a primary engineering material used e.g. in roofing and structural applications and especially for road paving.

For the purposes of the present invention, the expression "flowing bitumen" relates to bitumen, which is heated to a temperature where its viscosity is sufficiently low that it gets flowable and can e.g. be transported in a pipe by applying pressure, e.g. by pumping, or will spread over the surface of aggregate particles, when mixed therewith.

The term "asphalt" is well understood by a skilled person to refer to a mixture of aggregate and bitumen. In the asphalt, the bitumen acts as a binder for the aggregates, which are bonded together by the bitumen to form a mass suitable for the desired purpose, in particular for road construction.

The term "aggregate" is well understood by a skilled person to refer to a particulate mineral material, in particular a particulate stone material, which is mixed with bitumen to provide a mixture suitable for road construction. Typically, the aggregate employed is rock indigenous to the area where the asphalt is produced. Suitable aggregate includes particulate granite, basalt, limestone, and the like, and mixtures thereof.

Here and throughout the specification, the prefixes $C_n$-$C_m$ used in connection with compounds or molecular moieties each indicate a range for the number of possible carbon atoms that a molecular moiety or a compound can have. The term "$C_1$-$C_n$ alkyl" denominates a group of linear or branched saturated hydrocarbon radicals having from 1 to n carbon atoms. For example, the term $C_1$-$C_{20}$ alkyl denominates a group of linear or branched saturated hydrocarbon radicals having from 1 to 20 carbon atoms, while the terms $C_1$-$C_{10}$ alkyl and $C_1$-$C_4$ alkyl denominate a group of linear or branched saturated hydrocarbon radicals having from 1 to 10 carbon atoms or 1 to 4 carbon atoms, respectively. Examples of alkyl include but are not limited to methyl, ethyl, n-propyl, isopropyl, n-butyl, 2-butyl, 2-methylpropyl (isopropyl), 1,1-dimethylethyl (tert-butyl), pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl docosyl and their isomers. Examples of $C_1$-$C_4$-alkyl are for example methyl, ethyl, propyl, 1-methylethyl, butyl, 1-methylpropyl, 2-methylpropyl or 1,1-dimethylethyl.

Here and throughout the specification, the term "(meth)acryl" includes both acryl and methacryl groups. Hence the term "(meth)acrylate" includes acrylate and methacrylate and the term "(meth)acrylamide" includes acrylamide and methacrylamide.

It is apparent to a skilled person that all steps i), ii) and iii) are carried out continuously and that all conditions given here, i.e. pressure, temperature and relative amounts of water, polymer etc. are under steady state conditions. Further, it is apparent to a skilled person that flow rates of the hot bitumen stream and injection rates will depend on the size and internal geometries of the mixing apparatus and the desired amount of polymer and can be determined by routine.

In the process of the invention, a bitumen is heated and pressurized in step i) in order to obtain a flowing bitumen stream. The process is not limited to a particular bitumen grade. Rather, a large variety of bitumen grades may be used in the process of the invention. Usually an unmodified bitumen material is used. The term "unmodified bitumen" includes any bitumen, which is not polymer modified bitumen. However, it is also possible to use an already polymer modified bitumen such as an elastomer modified bitumen PMB A) or a plastomer modified bitumen (PmB C).

The preferred bitumen used in the process are paving grade bitumen. These materials are semi-solid at normal temperatures and are used mainly as the binder in asphalts for road constructions. Paving grade asphalts are defined by reference to their penetration, as determined by the needle penetration test in accordance with DIN EN1426:2015-09. Thereby, a standardized needle is applied to 100 g of a weight at a temperature of 25° C. for 5 seconds. The penetration depth of the needle is determined in tenths of a millimeter. The numerical values in the designation of a bitumen, e.g. bitumen 50/70, 70/100, 160/220, indicate the range in which the penetration depth of the needle lies for these grades. For example, 50/70 means that the penetration depth is between 5 and 7 mm, while 160/220 means that the penetration depth is between 16 and 22 mm, and so on. Bitumen according to the invention can have a wide range of penetration values ranging from as low as 1 or 4 mm for the harder asphalts up to 20 to 30 mm for softer asphalts, as determined in accordance with DIN EN1426:2015-09 at 25° C., applying a load of 100 g for 5 seconds. The most widely used bitumen according to the present invention generally has a penetration determined in accordance with DIN EN1426:2015-09 at 25° C. of about 1 to 25 mm, in particular 2 to 22 mm, especially 3 to 20 mm. Examples are the following bitumen grades: 10/40, 25/55, 30/45, 40/100, 45/80, 50/70, 60/70, 70/80, 70/100, 80/100, 160/200. Especially, the bitumen has a penetration of about 40 to 80, very especially 50 to 70. In the embodiments according to the invention, the bitumen preferably remains viscoelastic in all weather conditions.

Bitumen, which can be used in the process of the invention can have a wide range of softening points ranging from 25° C. to 160° C., in particular from 30 to 100° C., especially from 40 to 80° C. The softening points referred to are those, which are determined by the ring and ball test in accordance with DIN EN1426:2015-09. For this, a steel ball is placed on a layer of bitumen in a ring having an inner diameter of 15.7 mm. In the course of the test, the temperature of the material is increased by 5 K/min, starting at a temperature of 5° C. The softening point is the temperature at which a layer of bitumen in a measuring ring is deformed by a 3.5 g steel ball.

Bitumen which can be used in the process of the invention frequently have a breaking point according to Fraass of at most −5° C., as determined in accordance DIN EN 12593:2015-09.

Apart from that, typical further properties of bitumen suitable for the purpose of the invention, including non-modified bitumen, polymer modified bitumen, such as elastomer modified bitumen and plastomer modified bitumen, will have the properties for the desired application. Properties for paving grade bitumen can also be taken from TL Bitumen StB07-3 (Technical Delivery Conditions for road bitumen and ready-to-use polymer modified bitumen) and from DIN EN 12591:2009-08 and DIN EN 14023:2013-04. Besides the aforementioned properties, i.e. penetration, softening point and breaking point according to Fraass, such properties include in particular the rheological parameters at elevated application temperatures as determined by dynamic shear rheometer, such as shear modulus and phase angle, the rheological parameters at low application temperatures as determined by bending beam rheometer (BBR), such as low temperature stiffness and m-values, and force ductility.

In step i) the bitumen is heated to a temperature where its viscosity is sufficiently low that it is flowable and can be pumped. Preferably, in step i) the bitumen is heated to a temperature of at least 105° C., in particular to a temperature of at least 110° C., especially at least 120° C. Usually, in step i) the temperature will not exceed 230° C., in particular 210° C. Preferably, the temperature does not exceed 190° C., especially 180° C. Frequently, in step i) the bitumen is heated to a temperature in the range from above 105° C. to 230° C., in particular in the range from 110 to 210° C., preferably in the range from 110 to 190° C. or in the range from 120 to 190° C., especially in the range from 110 to 180° C. or in the range from 120 to 180° C.

Generally, in step i) the bitumen is pressurized to a pressure, which is higher than atmospheric pressure. In particular, the bitumen is pressurized to a pressure of at least 1 bar above atmospheric pressure, in particular at least 2 bar above atmospheric pressure. Usually, the pressure will not exceed 10 bar. Pressurizing can be achieved by suitable pumps. Preferably, the bitumen is pressurized to a pressure, which is higher than the vapor pressure of water at the temperature of the hot bitumen. In particular, the bitumen is pressurized to a pressure, which is at least 0.1 bar, in particular at least 0.2 bar and especially at least 0.5 bar higher than the vapor pressure of water at the temperature of the hot bitumen.

In step ii) an aqueous polymer dispersion is injected under pressure into the hot flowing bitumen stream obtained in step i). Thereby, a pressurized flowing mixed stream of the bitumen and the aqueous polymer dispersion is obtained.

Principally any aqueous polymer dispersion can be used for the purpose of the invention. In particular, the polymer contained in the polymer dispersion is elastic or at least thermoelastic.

Usually, the polymer of the aqueous polymer dispersion is characterized by having a glass transition temperature $T_G$ in the range from −110° C. to +100° C., preferably −80° C. to +40° C., especially −60° C. to +20° C., as determined by the differential scanning calorimetry (DSC) method according to ISO 11357-2:2013, preferably with sample preparation according to ISO 16805:2003.

Frequently, the dispersed particles of the aqueous polymer dispersions have a volume average particle diameter, also termed as D(4.3) value, in the range from 30 nm to 2 μm. In particular, the particle size may range from 50 nm to 1.5 μm or from 80 nm to 1 μm. The values given here refer to the values as determined by quasielastic light scattering (QELS), also known as dynamic light scattering (DLS). The measurement method is described in the ISO 13321:1996 standard.

The aqueous polymer dispersion has preferably a solids content of at least 10% by weight, in particular at least 20% by weight, preferably in the range from 10 to 72% by weight, especially 20 to 70% by weight, based on the total weight of the aqueous polymer dispersion. If polymer dispersions are used, which have a higher solids content, it may be necessary to dilute them with water prior to injection to the ranges given here. The solids content is the amount of non-volatile matter in the aqueous polymer dispersion as determined in accordance with DIN EN ISO 3251:2008-06.

Examples of suitable aqueous polymer dispersions include aqueous dispersions of the following polymers: acrylate polymers, including styrene acrylates, pure acrylates and acrylate rubbers (ACM), copolymers of alkyl acrylates with ethylene (AEM), polyester urethanes (AU), polybutadiene (BR), ethylene-acrylonitrile copolymers (ENM), epoxidized natural rubbers (ENR), ethylene-propylene-diene terpolymers (EPDM), ethylene-propylene copolymers (EPM), polyethylene (PE), polypropylene (PP), polyisobutene (PIB), polyether urethanes (EU), ethylene-vinyl acetate copolymers (EVM), fluorinated rubbers (FKM), fluorosilicone rubbers (FVMQ), propylene oxide-allyl glycidyl ether copolymers (GPO), isobutene-isoprene copolymers (IIR), isoprene rubbers (IR), nitrile rubbers (NBR), natural rubber (NR), thioplastics (OT), styrene-butadiene copolymers (SB), styrene-butadiene rubbers (SBR), carboxyl-containing acrylonitrile-butadiene copolymers (XNB), carboxyl-containing styrene-butadiene copolymers (XSB), carboxyl-containing styrene-butadiene rubbers (XSBR) and mixtures thereof.

In particular, the aqueous polymer dispersion is an aqueous dispersion of a styrene-butadiene copolymer, including SB, SBR, XSB and XSBR, and mixtures thereof. Therefore, the copolymers contained in such preferred aqueous polymer dispersions preferably comprise polymerized repeating units of styrene and/or a styrene derivative and polymerized repeating units of butadiene. In such polymers, typically the polymerized butadiene is 1,2-linked and/or 1,4-linked and still and the copolymers still have ethylenically unsaturated bonds which are susceptible to vulcanization. Preference is given to aqueous dispersions of butadiene-styrene copolymers, wherein the weight ratio of styrene to butadiene is in the range 10:90 to 90:10, in particular from 20:80 to 80:20, especially from 25:75 to 75:25. Usually, in these polymer dispersions the total amount of polymerized styrene and butadiene is at least 80% by weight, based on the total amount of monomers forming the styrene-butadiene copolymer.

Besides styrene and butadiene, the styrene-butadiene copolymer may contain other monomers, i.e., include other monomer units. The amount of these other monomers will usually not exceed 20% by weight, in particular is 15% by weight or less, or 10% by weight or less, based on the total amount of monomers forming the styrene-butadiene copolymer.

The aqueous polymer dispersion may also be an aqueous dispersion of copolymer of styrene with at least one acrylate ester and optionally one or more methacrylate esters, also termed styrene acrylate copolymer dispersions or styrene acrylates, or a copolymer of at least one methacrylate ester with at least one acrylate ester, also termed pure acrylate copolymer dispersion or pure acrylates. Suitable acrylate esters in styrene acrylates and in pure acrylates are $C_1$-$C_{20}$ alkyl esters of acrylic acid and $C_5$-$C_{20}$-cyloalkyl esters of acrylic acid. Suitable methacrylate esters in styrene acrylates and pure acrylates are $C_1$-$C_{20}$ alkyl esters of methacrylic acid and $C_5$-$C_{20}$-cyloalkyl esters of methacrylic acid.

Examples of $C_1$-$C_{20}$ alkyl esters of acrylic acid include, but are not limited to methyl acrylate, ethyl acrylate, n-propyl acrylate, isopropyl acrylate, n-butyl acrylate, 2-butyl acrylate, tert-butyl acrylate, n-pentyl acrylate, isopentyl acrylate, n-hexyl acrylate, n-heptyl acrylate, n-octyl acrylate, 2-ethylhexyl acrylate, 2-propylpentyl acrylate, n-decyl acrylate, 2-propylheptyl acrylate, $C_{10}$ isoamyl guerbet acrylate, 1-propylheptyl acrylate, lauryl acrylate and stearyl acrylate. Examples of $C_1$-$C_{20}$ alkyl esters of methacrylic acid include, but are not limited to methyl methacrylate, ethyl methacrylate, n-propyl methacrylate, isopropyl methacrylate, n-butyl methacrylate, 2-butyl methacrylate, tert-butyl methacrylate, n-pentyl methacrylate, isopentyl methacrylate, n-hexyl methacrylate, n-heptyl methacrylate, n-octyl methacrylate, 2-ethylhexyl methacrylate, 2-propylpentyl methacrylate, n-decyl methacrylate, 2-propylheptyl methacrylate, $C_{10}$ isoamyl guerbet methacrylate, 1-propylheptyl methacrylate, lauryl methacrylate and stearyl methacrylate. Examples $C_6$-$C_{20}$-cyloalkyl esters of acrylic acid include, but are not limited to cyclopentyl acrylate, cyclohexyl acrylate, 4-methylcyclohexyl acrylate and 4-tert-butylcyclohexyl acrylate. Examples of $C_5$-$C_{20}$-cyloalkyl esters of methacrylic include, but are not limited to cyclopentyl methacrylate, cyclohexyl methacrylate, 4-methylcyclohexyl methacrylate and 4-tert-butylcyclohexyl methacrylate.

Besides styrene, acrylate esters and methacrylate esters, the styrene acrylates and the pure acrylates may contain other monomers, i.e., include other monomer units. The amount of these other monomers will usually not exceed 20% by weight, in particular is 15% by weight or less, or 10% by weight or less, based on the total amount of monomers forming the respective copolymer.

The polymer of the polymer dispersion, in particular the styrene-butadiene copolymers, the styrene acrylates copolymers and the pure acrylates can also include crosslinking monomers. The amount of crosslinking monomers will usually not exceed 5% by weight, in particular 2% by weight, based on the total amount of monomers forming the respective polymer. When used in the styrene-butadiene copolymers, styrene acrylate copolymers or pure acrylate polymers the crosslinking monomers can e.g. be present in an amount of from 0.01 to 5% by weight or in an amount from 0.2 to 2% by weight, based on the total amount of monomers forming the respective polymer.

Suitable crosslinking monomers are in particular monomers which contain at least two non-conjugated ethylenically unsaturated double bonds. Exemplary crosslinking monomers include divinylbenzene, diesters or triesters of dihydric and trihydric alcohols with monoethylenically unsaturated $C_3$-$C_6$ monocarboxylic acids, e.g., di(meth)acrylates, tri(meth)acrylates), and tetra(meth)acrylates, e.g. alkylene glycol diacrylates and dimethacrylates, such as ethylene glycol diacrylate, 1,3- butylene glycol diacrylate, 1,4-butylene glycol diacrylate and propylene glycol diacrylate, trimethylolpropan triacrylate and trimethacrylate, pentaerythrit triacrylate and pentaerythrit tetraacrylate, but also vinyl and allyl esters of ethylenically unsaturated acids such as vinyl methacrylate, vinyl acrylate, allyl methacrylate, allyl acrylate, and divinyl and diallyl esters of dicarboxyilic acids, such as diallyl maleate and diallyl fumarate and also methylenebisacrylamide. Suitable crosslinking monomers are having at least one ethylenically unsaturated double bond and a further reactive group susceptible to a post-crosslinking reaction, including ethylenically unsaturated monomers containing a keto group, e.g., acetoacetoxyethyl (meth)acrylate or diacetonacrylamide; monomers containing an urea group, e.g. ureidoethyl (meth)acrylate, silane crosslinkers, e.g. vinyl triethoxysilane, 3-methacryloxypropyl trimethoxysilane and 3-mercaptopropyl trimethoxy silane, epoxy functionalized (meth)acrylate monomers, e.g. glycidyl methacrylate, N-alkylolamides of α,β-monoethylenically unsaturated carboxylic acids having 3 to 10 carbon atoms and esters thereof with alcohols having 1 to 4 carbon atoms, e.g. N-methylolacrylamide and N-methylolmethacrylamide.

The polymer of the polymer dispersion, in particular the styrene-butadiene copolymers, the styrene acrylate copolymers and the pure acrylate polymers, may include repeating units of acid monomers. The amount of these acid monomers will usually not exceed 10% by weight, in particular is 5% by weight or less, based on the total amount of monomers forming the respective polymer. When used in the styrene-butadiene copolymers, styrene acrylate copolymers or pure acrylate polymers the acid monomers can e.g. be present in an amount of from 0.01 to 5% by weight or in an amount from 0.2 to 2% by weight, based on the total amount of monomers forming the respective polymer. Acid monomers have usually one acid group such as a carboxyl group (COOH), sulfonic acid groups ($SO_3H$), phosphonic acid groups and phosphate groups. Examples of acid monomers are monoethylenically unsaturated $C_3$-$C_6$-monocarboxylic acids such as acrylic acid, methacrylic acid, and monoethylenically unsaturated $C_4$-$C_6$-dicarboxylic acids, such as itaconic acid and fumaric acid and mixtures thereof. Examples of acid monomers are also monoethylenically unsaturated sulfonic acids, such as vinyl sulfonic acid, styrene sulfonic acid, acryloxyethansulfonic acid and acrylamido-2-methylpropane sulfonic acid and the salts thereof, in particular the alkalimetal salts thereof and also monoethylenically unsaturated sulfonic acids.

Further monomers of styrene-butadiene copolymers may be non-ionic ethylenically unsaturated monomers, for example, conjugated diene monomer different from butadiene, e.g., isoprene or chloroprene, vinyl aromatic monomer such as a-methylstyrene or o-chlorostyrene, ethylenecially unsaturated nitriles such as acrylonitrile or methacrylonitrile, amides of ethylenecially unsaturated acids such as acrylamide or methacrylamide, and $C_1$-$C_{10}$-alkyl esters of acrylic acid or methacrylic acid, such as methyl, ethyl, n-butyl, isobutyl and 2-ethylhexyl acrylates and methyl, ethyl, n-butyl, isobutyl and 2-ethylhexyl methacrylates.

Further monomers of styrene acrylate copolymers and the pure acrylate polymers may be non-ionic ethylenically unsaturated monomers having an increased solubility in deionized water of e.g. at least 80 g/L at 20° C. and 1 bar, for example, ethylenically unsaturated nitriles such as acrylonitrile or methacrylonitrile, amides of ethylenecially unsaturated acids such as acrylamide or methacrylamide, and $C_2$-$C_4$-hydroxyalkyl esters of acrylic acid or methacrylic acid, such 2-hydroxyethyl acrylate, 2-hydroxyethyl methacrylate, hydroxypropyl acrylate and hydroxylpropyl methacrylate, monoethylenically unsaturated monomers bearing a keto group, such as diacetone acrylamide and diacetone methacrylamide and monoethylenically unsaturated monomers bearing an urea group, such as 2-(2-oxo-imidazolidin-1-yl)ethyl (meth)acrylate, 2-ureido (meth)acrylate, N-[2-(2-oxooxazolidin-3-yl)ethyl] methacrylate.

The aqueous polymer dispersion, in particular the aqueous polymer dispersions of styrene-butadiene copolymers, the aqueous polymer dispersions of styrene acrylate copolymers and the aqueous polymer dispersions of pure acrylate polymers, especially the aqueous polymer dispersions of styrene-butadiene copolymers, typically contains at least one surface active compound. The surface active compound serves to stabilize the aqueous dispersion of the polymer by keeping the formed particles of the polymer dispersed. The surface active compound may be an emulsifier, a protective colloid or a mixture of both of them. The emulsifier and the protective colloid are distinct from each other by their weight-average molar mass $M_w$. An emulsifier has typically a weight-average molar mass $M_w$ in general below 2000, while the weight-average molar mass $M_w$ of the protective colloid may be up to 50 000, in particular from above 2000 to up to 50000. Typically, the amount of the surface active compound is in the range from 0.1 to 10% by weight, in particular in the range from 0.5 to 5% by weight, based on the total amount of polymer in the aqueous polymer dispersion.

Preferably, the surface active compound comprises one or more emulsifiers. The emulsifier is non-ionic, anionic, or cationic. In case of employing a mixture of emulsifiers, their compatibility has to assured, which can be evaluated in case of doubt by preliminary tests. Typically, an anionic emulsifier is compatible with another anionic emulsifier or a non-ionic emulsifier. Similarly, a cationic emulsifier is typically compatible with another cationic emulsifier or a non-ionic emulsifier. Preferably, the emulsifier is an anionic emulsifier, a combination of two or more anionic emulsifier or a combination of at least one anionic emulsifier and at least one non-ionic emulsifier.

Non-ionic emulsifier are, for example, ethoxylated $C_8$-$C_{36}$ fatty alcohols having a degree of ethoxylation of from 3 to 50 (=ethylene oxide units [EO]: 3-50) and ethoxylated mono-, di- and tri-$C_4$-$C_{12}$ alkylphenols having a degree of ethoxylation of from 3 to 50. Examples of customary nonionic emulsifiers are the Emulgin B grades (cetyl/stearyl alcohol ethoxylates, RTM BASF), Dehydrol LS grades (fatty alcohol ethoxylates, EO units: 1-10, RTM BASF), Lutensol A grades ($C_{12}C_{14}$-fatty alcohol ethoxylates, EO units: 3-8, RTM BASF), Lutensol AO grades ($C_{13}C_{15}$-oxo alcohol ethoxylates, EO units: 3-30), Lutensol AT grades ($C_{16}C_{18}$-fatty alcohol ethoxylates, EO units: 11-80), Lutensol ON grades ($C_{10}$-oxo alcohol ethoxylates, EO units: 3-11) and Lutensol TO grades ($C_{13}$-oxo alcohol ethoxylates, EO units: 3-20). Here and in the following the phrase "EO units" means the number average of ethylene oxide repeating units in the emulsifier.

Anionic emulsifiers include for example the alkali metal salts of dialkyl esters of sulfosuccinic acid, the alkali metal salts and the ammonium salt of $C_8$-$C_{12}$ alkyl sulfates, the alkali metal salts and the ammonium salts of $C_{12}$-$C_{18}$ alkylsulfonic acids, the alkali metal salts and the ammonium salts of $C_9$-$C_{18}$ alkylarylsulfonic acid, the alkali metal salts and the ammonium salts of sulfuric acid monoesters of ethoxylated $C_{12}$-$C_{18}$ alkanols (EO units: 4-30) or a sulfuric acid monoester of an ethoxylated ($C_4$-$C_{12}$ alkyl)phenol (EO units: 3-50). As further anionic emulsifiers, compounds of the general formula I (I)

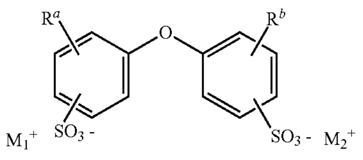

wherein $R^a$ and $R^b$ are each a H atom or $C_4$-$C_{24}$-alkyl and are not both H atoms at the same time, and $M_1^+$ and $M_2^+$ can be alkali metal ions and/or ammonium, are also useful. In the general formula I, $R^a$ and $R^b$ are preferably linear or branched alkyl radicals having from 6 to 18 carbon atoms, in particular 6, 12 or 16 carbon atoms, or hydrogen atoms, where $R^a$ and $R^b$ are not both hydrogen atoms at the same time. $M_1^+$ and $M_2^+$ are preferably sodium, potassium or ammonium, with sodium being particularly preferred. A compound of general formula I, in which $M_1^+$ and $M_2^+$ are both sodium, $R^a$ is a branched alkyl radical having 12 carbon atoms and $R^b$ is hydrogen or $R^a$ is particularly advantageous. Use is frequently made of industrial mixtures which have a proportion of from 50 to 90% by weight of the monoalkylated product, for example Dowfax® 2A1 (RTM The Dow Chemical Corp.). The compounds of general formula I are commonly known, e.g. from U.S. Pat. No. 4,269,749, and commercially available. Further anionic emulsifiers are fatty alcohol phosphates, alkylphenol phosphates, alkyl polyglycol ether phosphates, alkyl polyalkylene oxide phosphates, and fatty alcohol ether phosphates and the salts thereof, in particular the alkalimetal salts and ammonium salts thereof, with particular preference given to the alkalimetal salts such as sodium salts.

A comprehensive description of suitable emulsifiers may be found in Houben-Weyl, Methoden der organischen Chemie, volume XIV/1, Makromolekulare Stoffe, Georg-Thieme-Verlag, Stuttgart, 1961, pages 192 to 208.

Like the aforementioned emulsifiers, suitable protective colloids may be non-ionic, anionic or cationic. Examples of protective colloids are poly(vinyl alcohols), poly(alkylene glycols), poly(acrylic acids) and the alkali metal salt thereof, poly(methacrylic acids) and the alkali metal salt thereof and gelatin derivatives. Anionic protective colloid can also be a copolymer, containing a suitable amount of at least one anionic monomer, such as acrylic acid, methacrylic acid, maleic acid, 2-acrylamido-2-methylpropane sulfonic acid, para-vinylphenyl sulfonic acid or salt forms thereof, preferably alkali metal salts thereof, in polymerized form. Examples of cationic protective colloids are homopolymers and copolymers containing a sufficient amount of cationic monomers, in particular monoethylenically unsaturated monomers having one or more amino groups, which are N-protonated or N-alkylated. Examples include N-protonated and N-alkylated derivatives of homopolymers or copolymers of N-vinylformamide in their at least partly hydrolyzed form, homopolymers or copolymers of N-vinylacetamide in their at least partly hydrolyzed form, N-protonated and N-alkylated derivatives of homopolymers or copolymers of N-vinylcarbazole, N-protonated and N-alkylated derivatives of homopolymers or copolymers of 1-vinylimidazole, N-protonated and N-alkylated derivatives of homopolymers or copolymers of 2-vinylimidazole, N-protonated and N-alkylated derivatives of homopolymers or copolymers of 2-vinylpyridine, N-protonated and N-alkylated derivatives of homopolymers or copolymers of 4-vinylpyridine, N-protonated and N-alkylated derivatives of homopolymers or copolymers of amine-group-bearing acrylates, N-protonated and N-alkylated derivatives of homopolymers or copolymers of amine-group-bearing methacrylates, wherein the nitrogen of the amine-group is protonated at a pH below 7 or is permanently positively charged, for example by alkylation. Further comonomers in such cationic protective colloids may be acrylamide, methacrylamide and N-vinyl pyrrolidone.

The protective colloids are distinct from the polymers dispersed in the aqueous polymer dispersion as they are water-soluble or water dispersible. The term "water-soluble or water dispersible" is understood that the corresponding protective colloid can be dissolved or dispersed in deionized water at 20° C. and 1013 mbar in an amount of at least 10 g/L polymer such that the resulting aqueous solution has either no measurable particle size or a particle size of at most 20 nm as determined by dynamic light scattering in accordance with DIN 22412:2008.

A comprehensive description of suitable protective colloids may be found in Houben-Weyl, Methoden der organischen Chemie, volume XIV/1, Makromolekulare Stoffe, Georg-Thieme-Verlag, Stuttgart, 1961, pages 411 to 420.

The aqueous polymer dispersions, in particular the aqueous polymer dispersions of styrene-butadiene copolymers, are well known to a skilled person and usually prepared by a radical aqueous emulsion polymerization technique, such as described in "Emulsionspolymerisation" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); Dispersionen synthetischer Hochpolymerer [Dispersions of Synthetic High Polymers], F. Hölscher, Springer-Verlag, Berlin (1969)] and WO 2012/049651, which is hereby incorporated by reference. Apart from that, aqueous polymer dispersions, in particular the aqueous polymer dispersions of styrene-butadiene copolymers, are commercially available. Examples of commercially available aqueous polymer dispersions of styrene-butadiene copolymers are the Butonal® types, Styrofan® grades, Butofan® grades, Basonal® grades and the Styronal grades of BASF SE, Litex® and Lipaton® grades of Synthomer and Ligos® grades of Trinseo. Examples of commercially available aqueous polymer dispersions of styrene acrylates and pure acrylates are the Acronal® grades of BASF, the Mowilith® grades and the Vinamul® grades of Celanese, the Acrygen® grades of Omnova and the Rhoplex® grades of Dow.

Preferably, the amount of the aqueous polymer dispersion injected into the flowing bitumen is such that the resulting amount of polymer of the polymer dispersion in the flowing mixed stream is in the range from 0.5 to 7.0% by weight, in particular 1.0 to 5.0% by weight, based on the total weight of the bitumen.

Preferably, the total amount of water in the pressurized hot flowing mixed stream prior to step iii) is in the range from 0.5 to 8.0% by weight, in particular 1.0 to 6.0% by weight, based on the total weight of weight of the bitumen.

By introducing the aqueous polymer dispersion, the water contained in the polymer dispersion is introduced into the flowing bitumen and thus contributes to the water required for foaming. In particular, the amount of water which is introduced into the flowing bitumen stream by injecting the aqueous polymer dispersion contributes at least 20% to the total amount of water contained in the flowing mixed bitumen stream prior to expansion. Additional water may be injected prior to the expansion of the hot flowing bitumen stream before or after the injection of the aqueous polymer dispersion. Preferably, not more than 80% of additional water, based on the total amount of water present in the bitumen prior to expansion, is introduced into the flowing bitumen stream.

Preferably, the aqueous polymer dispersion and optionally additional water are injected into the hot flowing bitumen in such an amount that the total amount of water in the pressurized hot flowing mixed stream is in the range from 0.5 to 8.0% by weight, in particular 1.0 to 6.0% by weight, based on the total weight of weight of the bitumen.

Together with the aqueous polymer dispersion, one or more additives conventionally used for modifying bitumen may be injected into the flowing bitumen. These additives, sometimes referred to as reactive agents, include vulcanizing agents, in particular sulfur-based vulcanizing agents, vulcanization accelerators and antireversion agents. These additives may be included into the aqueous polymer dispersion before the polymer dispersion is injected into the bitumen stream. However, it is also possible to inject one or more additives into the bitumen, preferably as an aqueous solution or emulsion or dispersion, separately from the aqueous polymer dispersion into the pressurized bitumen stream, as long as the additive is injected into the flowing bitumen stream concomittantly with the aqueous polymer dispersion. Preferably, the additives comprise at least one vulcanizing agent, optionally in combination with at least one further additive, which is preferably selected from the group consisting of vulcanization accelerators and antireversion agents and combinations thereof. If present, the additives are typically used in a total amount in the range from 0.2 to 15% by weight, or from 0.3 to 11% by weight, or from 0.5 to 6% by weight, based on the weight of the polymer in the polymer dispersion.

Vulcanizing agent, vulcanization accelerators and antireversion agents are known to the skilled person and described e.g. in WO 2012/049651, which is hereby incorporated by reference.

Suitable vulcanizing agents include sulfur such as sulfur powder, precipitated sulfur, colloidal sulfur, insoluble sulfur and high-dispersible sulfur; sulfur halides such as sulfur monochloride, and sulfur dichloride; sulfur donors such as 4,4'-dithiodimorpholine, carbon disulfide and dimercaptopropanol; selenium; tellurium; organic peroxides such as dicumyl peroxide and di-tert-butyl peroxide; quinone dioximes such as p-quinone dioxime and ρ,ρ'-dibenzoylquinone dioxime; organic polyamine compounds such as triethylene tetramine, hexamethylene diamine carbamate, 4,4'-methylenebis(cyclohexylamine) carbamate and 4,4'-methylenebis-o-chloroaniline; alkylphenol resins having a methylol group, and mixtures thereof. Preferably, the vulcanizing agents include sulfur dispersions or sulfur donors. If present, the vulcanizing agent is typically used in an amount in the range from 0.1 to 15% by weight, or from 0.3 to 10% by weight, or from 0.5 to 5% by weight, based on the weight of the polymer in the polymer dispersion.

Suitable vulcanization accelerators include sulfenamide-type vulcanization accelerators, guanidine-type vulcanization accelerators, thiourea-type vulcanization accelerators, thiazole-type vulcanization accelerators, thiadiazine-type vulcanization accelerators, thiuram-type vulcanization accelerators, dithiocarbamic acid-type vulcanization accelerators, pentamethylene dithiocarbamate, xanthogenic acid-type vulcanization accelerators, isophthalate-type vulcanization accelerators, aldehyde amine-type vulcanization accelerators, dithiocarbonates and mixtures thereof. If present, the vulcanization accelerators are typically used in an amount in the range from 0.1 to 1% by weight, or from 0.3 to 10% by weight, or from 0.5 to 5% by weight based on the weight of the polymer in the polymer dispersion.

Antireversion agents can also be included in the vulcanization system to prevent reversion, i.e. an undesirable decrease in crosslink density. Suitable antireversion agents include zinc salts of aliphatic carboxylic acids, zinc salts of monocyclic aromatic acids, bismaleimides, biscitraconimides, bisitaconimides, aryl bis-citraconamic acids, bissuccinimides, and polymeric bissuccinimide polysulfides, e.g., N,N'-xylenedicitraconamides. If present, the antireversion agents are typically used in an amount in the range from 0 to 5%, from 0.1 to 3%, or from 0.1 to 2% by weight based on the weight of the polymer in the polymer dispersion.

According to the invention, in step ii) the aqueous polymer dispersion and optionally the one or more additives are injected into the hot flowing bitumen stream under pressure. Thereby a pressurized flowing mixed stream of the bitumen and the aqueous polymer dispersion is obtained, wherein the polymer dispersion is distributed in the hot bitumen stream.

Then, in step iii) the pressurized hot mixed stream of bitumen and the aqueous polymer dispersion is expanded, preferably to atmospheric pressure. Thereby, at least a majority of the water contained in the aqueous polymer dispersion evaporates, presumably as small bubbles captured by the bitumen/polymer mixture in the expanded mixed stream, and thereby foams the mixed stream to obtain a polymer-modified bitumen foam. This results in the advantage that the entire water contained in the polymer dispersion or at least a majority of it is used as blowing agent for foaming the polymer modified bitumen and no additional water or air is required. However, it is possible to inject additional water, steam and/or air to foster foam formation. However, the injection of additional water, steam and/or air is usually not required.

Injection of step ii) and expansion of step iii) can be performed by analogy to the known processes for producing foamed bitumen by injection of water into hot pressurized bitumen, as described the prior art discussed at the outset. The production of foamed bitumen by injecting water and suitable apparatuses for this are described e.g. in U.S. Pat. No. 4,692,350, WO 98/35102, WO 2014/089712, to which full reference is made.

In order to achieve a good distribution of the polymer dispersion in the hot pressurized bitumen stream, the injection pressure of the aqueous dispersion is usually at least slightly higher than the pressure of the pressurized hot bitumen stream. Frequently, the injection pressure of the polymer dispersion is at least 0.1 bar, in particular at least 0.5 bar or at least 1 bar higher than the pressure of the pressurized bitumen.

During injection of the polymer dispersion, generally a pressure of the mixture of at least 1 bar above atmospheric pressure, in particular at least 2 bar above atmospheric pressure is maintained. The total pressure of the mixed hot will generally not exceed 10 bar. Preferably, the bitumen is pressurized to a pressure, which is higher than the vapor pressure of water at the temperature of the hot bitumen. In particular, the bitumen is pressurized to a pressure, which is at least 0.1 bar, in particular at least 0.2 bar and especially at least 0.5 bar higher than the vapor pressure of water at the temperature of the hot bitumen. This pressure guarantees that at least the majority of the injected polymer dispersion remains liquid and is preferably present as liquid drops in the hot flowable bitumen stream. It has been noticed that a particularly good foaming effect can be attained by keeping the majority of the aqueous polymer dispersion liquid, particularly when the pressure of the mixture stream is reduced to atmospheric pressure.

During injection of the polymer dispersion, generally a temperature of the hot mixed stream of at least 105° C., preferably at least 110° C., in particular at least 120° C., especially at least 130° C. is maintained. In particular, the temperature of the hot mixed stream is in the range from 105 to 180° C., in particular in the range from 110 to 170° C. or in the range from 120 to 160° C. and especially in the range from 130 to 150° C. The temperature of the polymer dispersion prior to injection is of minor importance and is frequently in the range from 10 to 50° C. Usually, no heating of the polymer dispersion will be carried out.

According to a preferred embodiment of the process, the temperatures and pressures of the bitumen stream and of the injected polymer dispersion are chosen in such a way that a viscosity ratio between injected liquid and bitumen is greater than 0.5, in particular from 0.5 to 1.5, at the injection point. In this way forming of finer liquid drops in the binder stream is favoured, adding up to a good foam quality.

A skilled person will appreciate that the relative volume flow rates of the hot bitumen stream and that of the polymer dispersion and also of the optionally injected additive will be adjusted such that the desired mass ratios of bitumen to polymer, water and additives are achieved.

The injection is usually performed in a mixing chamber in order to achieve that pressurized flowing mixed stream is obtained, where the polymer dispersion and the optionally present reactive compounds are evenly distributed in the hot bitumen.

Preferably, step ii) is performed without dynamic mixing, i.e the mixing chamber has no dynamic mixing elements. The mixing chamber may be a simple chamber, in particular a tubular chamber, without having mixing elements, or it may a chamber, in particular a tubular chamber, having mixing elements, in particular static mixing elements.

The mixing chamber is typically connected to a bitumen supply system, for generating a pressurized flow of heated bitumen in the mixing chamber. Furthermore, the mixing chamber comprises means for injecting the aqueous polymer dispersion into the stream of the flowing bitumen in such a way that downstream of the injection point a pressurized mixture stream of flowing bitumen with an aqueous polymer dispersion is obtained in the mixing chamber.

In a preferred embodiment, the polymer dispersion is injected into the flowing bitumen in a mixing chamber to obtain the pressurized flowing mixed stream which is discharged from the mixing chamber through an orifice and thereby expanded. In particular, the mixing chamber has no dynamic mixing elements. However, it may have static mixing elements.

In a particular embodiment, the aqueous polymer dispersion is injected into the flowing bitumen stream at an angle of >90°, in particular at an angle of >120°, especially at an angle of 180° with respect to the flow direction of the flowing bitumen stream. Thus, the aqueous polymer dispersion is injected in a direction oblique-angled and/or against the direction of flow of the flowing bitumen. These measures allow a particularly good distribution of the aqueous polymer dispersion in the flowing bitumen stream and an improvement of foam quality. In this particular embodiment, the mixing chamber does not require mixing elements and is typically free of static or dynamic mixing elements. In this particular embodiment, the injection of the aqueous polymer dispersion into the hot bitumen stream is preferably done in the center of the binder stream. In this preferred embodiment, the injection pressure of the liquid is preferably adjusted in such a way that the injection speed of the polymer speed is at least double the flow speed of the hot bitumen stream in the area of the injection point. It has been noticed that these measures favour formation of fine liquid drops in the binder stream and as a consequence make possible a further improvement of foam quality. In this particular embodiment, the flow speed of the hot bitumen stream is preferably adjusted in such a way that an elongational flow is present at least in a partial area of the bitumen stream, preferably in the area of the injection point of the polymer dispersion and advantageously additionally at least in a certain partial area downstream of the injection point. It is even more preferred that an elongational flow is present along a majority of the elongation or along the entire elongation of the binder stream between the injection point and the point where the pressure of the mixture stream is reduced for foaming the binder. By generating an elongational flow it is possible to further separate the liquid drops carried by the binder stream after the injection point into smaller liquid drops, this being advantageous for a finer foam structure of the binder foam produced from the mixture stream. Advantageously, in case of this particular embodiment, the elongation of the hot bitumen stream between the injection point and the point where the pressure of the hot mixed stream is reduced for foaming the bitumen is chosen in such a way that it corresponds to a multiple of, preferably between twenty five times and fifty times, the diameter or the hydraulic diameter, respectively, of the bitumen stream at the injection point. Such a dimensioning has been found to be particularly practical.

In another particular embodiment, the aqueous polymer dispersion is injected into the flowing bitumen stream in a mixing chamber, which has at least one static mixing element, such as one or more flow breakers. In this case, the aqueous polymer dispersion is injected into the flowing bitumen stream at an angle of <90°, in particular at an angle of <45°, especially parallel or almost parallel to the flow direction of the flowing bitumen stream.

In step iii), the hot flowing mixed stream obtained in step iii) is released from the mixing chamber, where it is pressurized, resulting in an abrupt decrease of the pressure of the pressurized hot flowing mixed stream, advantageously to atmospheric pressure. Thereby, foaming of the polymer-modified bitumen is achieved as a result of the evaporation of the water contained in the aqueous polymer dispersion and optionally the water added additionally.

Preferably, the means for releasing the hot flowing mixed stream from the mixing chamber comprises one or more foaming nozzles. Preferably, a number of identical foaming nozzles is employed. The hot flowing mixed stream may be released directly on the agglomerates used for preparing the asphalt but it may also be released into an expansion chamber, from which the polymer modified bitumen foam can be discharged to the asphalt mixing chamber, where the polymer modified bitumen foam is mixed with the aggregates.

In particular groups of embodiments of the process of the invention, the apparatus comprises a container containing bitumen and one or more containers, which contain the aqueous polymer dispersion and the optional additive, respectively. If the apparatus comprises more than one container containing aqueous polymer dispersions, the aqueous polymer dispersions may be chemically identical or chemically different. From the container, a bitumen pump delivers the desired amount of hot flowing pressurized bitumen stream to the mixing chamber. Simultaneously, the desired amount of the aqueous polymer dispersion is delivered to the mixing chamber from the dispersion container by a second aqueous dispersion pump and injected into the mixing chamber via a suitable nozzle. In the mixing chamber the desired pressure is maintained and adjusted, e.g. by means of a pressure holding valve. The hot flowing mixed stream is then expanded via one or more nozzles, in particular via a plurality of nozzles arranged in a foam bar.

In a special embodiment step ii) and step iii) are carried out in a single foam bitumen device comprising an apparatus as described herein having at least one mixing chamber for a plurality of foaming nozzles arranged in a manner that they release the foam simultaneously. However, it is also possible that the apparatus comprises a plurality of mixing chambers having a single release nozzle, where the mixing chambers are arranged in a manner that they release the foam simultaneously.

The process of the invention provides a stable foamed polymer-modified bitumen composition having a good foam half-life.

Frequently, the foamed polymer-modified bitumen obtainable according to the invention has a foam half-life from about 90 seconds to about 5 minutes. in particular from 2 minutes to 4 minutes. Foam half-life is defined as the time it takes from the start of the foaming process, i.e. from the point in time where the hot flowing mixed stream is expanded, for the foamed PmB to recede to half the maximum height achieved during foaming. One hypothetical for illustrating the calculation/determination of the foam half-life is as follows: the onset of foaming begins at T (onset)=0 seconds; maximum foam volume and/or height is achieved at T(max)=10 seconds; and the foam volume and/or height reaches ½ of maximum value at T(half)=60 seconds. The foam half-life of this hypothetical scenario would be 60 seconds.

Frequently, the foamed polymer-modified bitumen obtainable according to the invention has an expanded volume, which is at least 50% larger, preferably at least 100% larger, in particular 300% larger, e.g. from 10 to 300% larger, preferably from 50 to 200% larger and especially from 50 to 300% larger than the volume of non-foamed polymer bitumen.

The foamed polymer modified bitumen composition may optionally comprise further additives, which are customary for the intended use. Examples of customary additives to building materials anti-statics, fillers, fibres, rejuvenators, waxes, anti-stripping agents, antioxidants and the like. These additives may be present in the bitumen used for foaming or they may be introduced simultaneously with the polymer dispersion or alternatively they may be dosed directly into the asphalt mixing chamber.

Examples of suitable fillers include talc, chalk, calcite, calcium carbonate, carbon black, fly ash, slate dust, limestone, dolomite, quartz flour, titanium dioxide, kieselgur, gypsum, magnesite, slate flour, barium sulfate and siliceous fillers such as clay, mica and other sheet silicates, and mixtures thereof.

Examples of suitable fibres include cellulose, glass and rock fibres.

The foamed polymer-modified bitumen according to the invention serves primarily as a binder in asphalt compositions, in particular in asphalt compositions for road constructions, hereinafter also termed paving mixes.

A further aspect of the invention relates to a process for producing an asphalt composition which comprises providing a foamed bitumen composition by a process according to the invention and described above, and mixing the foamed bitumen composition with aggregates, that are suitable for road construction, road rehabilitation, road repair, and/or road maintenance.

For this, the foamed polymer modified bitumen is mixed with the aggregate in controlled amounts, usually 2 to 10% by weight, based on the amount of aggregates. Mixing is preferably carried out at elevated temperatures, e.g. at 80 to 180° C., in particular in range of 90 to 150° C., after which the hot mix is transported to road sites, where it is placed and compacted on prepared bases. The term "road paving material" refers to material for paving all types of surfaces where paving is appropriate, such as roads, streets, runways, revetments, parking areas and the like.

Asphalt compositions obtained according to the present invention can preferably be maintained at elevated temperature, e.g. in range of 80 to 180° C., in particular in range of 90 to 150° C. during the production and then use in paving application. In some instances, it may be preferred to maintain the asphalt compositions at these temperatures in closed systems like large stock silos, storage silos, covered transport vehicles and like to ensure the availability at site under these temperature conditions.

Aggregate used for these purposes are typically derived from natural and synthetic sources. As in any construction process, aggregates are selected for asphalt paving application based on a number of criteria, including physical properties, compatibility with the bitumen to be used in the construction process, availability, and ability to provide a finished pavement that meets the performance specifications of the pavement layer for the traffic projected over the design life of the project. Among the aggregate properties that are key to successful road construction is gradation, which refers to the percent of aggregate particles of a given size. For most load-bearing asphalt pavements, three gradations are common: dense-graded, gap-graded and open-graded. Dense-graded aggregate exhibit the greatest mineral surface area (per unit of aggregate). Open-graded aggregate largely consist of a single, large-sized, e.g., around 1 to 2.5 cm, stone with very low levels, typically less than about two percent of the total aggregate, of fines, i.e. material with particle size of less than 0.4 cm, or filler, i.e. mineral material with particle size of less than 0.075 mm. Gap-graded aggregate fall between dense-graded and open-graded classes. Reclaimed asphalt pavement (RAP) material generally reflects the gradation of the pavement from which the reclaimed material was obtained. If the original pavement was a dense-graded mix, the RAP generally will also be dense graded, although the filler content is generally observed to be lower than the design limits of the original aggregate specifications.

Any aggregate which is traditionally employed in the production of bituminous paving compositions is suitable for use in combination with a foamed polymer bitumen obtainable according to the present invention, including dense-graded aggregate, gap-graded aggregate, open-graded aggregate, stone-matrix asphalt, recycled asphalt paving, and mixtures thereof. In certain embodiments, aggregate which is not fully dried can be employed. In such embodiments, for instance, pretreatment of the aggregate with an anti-stripping agent can be performed, if so desired. Drying and/or pre-treatment of the aggregate are optional steps in accordance to certain embodiments of the present invention. That is, the concern of a residual moisture content associated with the premixed (i.e., prior to be coated/mixed with an asphalt binder) aggregate is significantly mitigated by the incorporation of a quaternary organosilane in accordance to embodiments of the present invention.

Aggregates or mineral aggregates can comprise coarse particulate materials used in construction, including sand, gravel, crushed stone, soil, slag, recycled concrete, or mixtures thereof. Mineral fillers can also be utilized as aggregates which typically include dolomite, granites, river-bed crushed gravel, sandstone, limestone, basalt and other inorganic stones which can be added to the system. As referenced above, the particular aggregates, sand, soils etc. used in certain embodiments of the present invention are generally not critical as long as they have functional groups or reactive sites (e.g., silanol groups) on the surface that will bond with the silanols created by hydrolysis of the silane alkoxy groups.

Mixing the foamed polymer-modified bitumen composition and aggregate is typically carried out by the use of suitable mixers including drum mixers, pug mill batch mixers, static mixers, or dual mixers to coat the aggregate with the foamed polymer-modified bitumen composition. In certain alternative embodiments of the present invention, the step of mixing the foamed polymer-modified bitumen composition and aggregate comprises coating the aggregate with the foamed polymer-modified bitumen composition by spraying the foamed polymer-modified bitumen composition onto the aggregate through one or more nozzles, valves, or combination thereof.

As described above, the foamed polymer-modified bitumen composition can be mixed with, sprayed onto, or otherwise coated onto the outer surface of a variety of aggregates to provide an asphalt composition suitable for a variety of paving applications. That is, the asphalt compositions can be applied to a surface to be paved by methods known by those skilled in the art. Once applied to the surface to be paved, the asphalt compositions can be compacted using any of the compaction methods traditionally employed for paving applications. Preferably, the applied asphalt compositions can be compacted to an air void content comparable or lower to hot mix pavement compositions made at 15-25° C. higher temperatures having substantially equivalent aggregate gradation and bitumen content. Certain embodiments of the present invention can beneficially be compacted at a reduced temperature relative to preparations devoid of the polymers contained in the polymer dispersion. For instance, conventional compaction temperatures range from 120° C. to 130° C. The ability to compact embodiments of the present invention at reduced temperatures relative to the conventional temperatures is beneficially realized with embodiments of the present invention. Certain embodiments of the present invention can, for example, be compacted at a temperature from about 90° C. to about 115° C.

It is apparent that reduction in preparation temperature of the asphalt as achieved by the process of the present invention will lead to a significant reduction in fuel consumption as well as reducing the production of $CO_2$ per ton of asphalt mix. Additionally, the reduced temperatures can help mitigate the exposure of workers to any volatile organic vapors and odors associated with bitumen. Furthermore, workers during summer months, for example, find it especially difficult to work with hot mixes and the lowering of the preparation and compaction temperatures mitigates the level of heat stress realized by workers.

Where desired, the present invention can be used in in-situ production of asphalt compositions. Such in-situ operations include on-site recycling operations such as hot in-place recycling where an aged, distressed pavement may be heated with a variety of portable heater units, scarified, and recombined with asphalt binder to create a rejuvenated paving composition. The rejuvenated paving composition can be immediately extended over the width of the traffic lane and compacted to create a rejuvenated pavement riding surface.

BRIEF DESCRIPTION OF FIGURE

The invention is described in more detail in the following examples and figures.

FIG. 1: Schematic drawing of the foam bitumen device

FIG. 1 schematically depicts the foam bitumen device used for the examples described below. (1) displays the mixing chamber which is equipped with elements (13) of a static mixer and a gas inlet (11 & 17). The mixing chamber is connected with a bitumen line (2), a fluid line for the aqueous polymer dispersion (5) and a fluid line for further liquid additives or water (7) via a dosing nozzle, respectively (3, 6, 8). Each feeding line consists of a reservoir containing the respective feeding agent (14, 18, 9), a pump (12) and a flowmeter (10). The bitumen mixture in the chamber (1) can be readily discharged into the asphalt mixer (16) via a nozzle (15). By discharging it via the nozzle, the water contained in the pressurized mixture of bitumen, polymer dispersion and optional further additives, spontaneously expands and forms a foamed polymer modified bitumen.

EXAMPLES

The following starting materials were used:

Bitumen 1: Bitumen type 50/70 available from the refinery MiRo in Karlsruhe, Germany Bitumen 2: Bitumen Type 25/50-55: SBS modified bitumen: Olexobit 45 of Puma Energy Aqueous polymer dispersion 1: An aqueous XSB polymer dispersion having a solid content of 53% by weight, a glass transition temperature of −27° C., a viscosity of 220 mPas (100 $s^{-1}$, T=23° C.) and a pH of 6.8, which had been modified by addition of colloidal sulfur in an amount of 4% by weight, based on the polymer in the XSB polymer dispersion.

Aqueous polymer dispersion 2: An aqueous SB polymer dispersion having a solid content of 71% by weight, a glass transition temperature of −53° C., a viscosity of 1500 mPas (Brookfield RV, Spindle #3, at 20 rpm, 23° C.) and a pH of 10.

Production of Asphalt:

For the technical evaluation of the addition of polymer dispersions using a foam bitumen module, asphalt samples of type AC 11 DS with a bitumen content of 6 mass % were prepared. The production was carried out in an asphalt mixing plant equipped with a foam bitumen module according to FIG. 1. The basic function of the foam bitumen module used is described with respect to FIG. 1.

Besides the foam bitumen module, the asphalt mixing plant comprises containers for bitumen, containers for adding aqueous additives, both being connected with the foam bitumen module and mixing equipments for the foamed bitumen and the aggregates.

Examples 1 to 3 According to the Invention

In the examples 1 to 3 according to the invention, a hot bitumen stream, which was heated to a temperature of about 170° C. was introduced at a pressure of 5 bar into the foam bitumen module and the polymer dispersion 1 was injected with a pressure of 10 bar into the pressurized hot pressurized bitumen stream present in the foam bitumen module. In the foam bitumen module, a temperature of 135° C. and a pressure of 6 bar was maintained before the sample was expanded to a foam. Foams with a polymer content of 2.5% b.w., 3.0% b.w., and 3.5% b.w. (solid dispersion on mass of bitumen) were produced accordingly. The foamed bitumen was then mixed with the preheated aggregates in an amount of approximately 6% by weight of foamed bitumen based on the amount of aggregates to obtain an asphalt of type AC 11 DS. Mixing was carried out in a twin-shaft compulsory mixer at temperatures of about 175° C. for about 30 s.

Example 4 According to the Invention

Example 4 was prepared according to the general procedure of example 2 but with the exception that the aqueous polymer dispersion 2 was used instead of the aqueous polymer dispersion 1. Foams with a polymer content of 3.0% b.w. (solid dispersion on mass of bitumen) were produced accordingly.

Comparative Examples

In comparative examples 1 and 2, asphalt samples of type AC 11 DS with a bitumen content of 6 mass % were produced using bitumen 1 and bitumen 2, respectively, each of which was heated to 180° C. The heated respective bitumen types were mixed for 30 s in a twin-shaft compulsory mixer with the aggregates preheated to 220° C.

In comparative examples 3 and 4, asphalt samples of type AC 11 DS were produced by analogy to examples 1 to 3 but using bitumen 1 and 2, respectively and replacing the polymer dispersion by the 3% by weight of water.

The Asphalt Samples

Wheel-Tracking-Test:

The form stability of the asphalt was determined by means of the tracking test carried out in accordance with TP Asphalt-StB Part 22. 10000 load cycles were carried out at 60° C., and the track depth in mm was then determined (WTS Air).

Cooling Test and Tensile Test:

The low temperature stability of the asphalt was measured by the cooling test according to TP Asphalt-StB Part 22 46 A. Furthermore, the bitumen produced conventionally on the basis of bitumen 1 and bitumen 2, respectively as well as the example 2 (3% dispersion) were characterized by means of a uniaxial tensile test at −10° C.

The experimental data are summarized in table 1.

TABLE 1

| | | sample body | | tracking formation | | | cooling test | | tensile test | |
|---|---|---|---|---|---|---|---|---|---|---|
| | | | degree of | groove | [%] groove | tracking formation rate | | | | elonga- |
| Example | bitumen composition | density [g/cm³] | compression [%] | depth [mm] | depth [%] | WTS air [mm] | Temp. [° C.] | tension [N/mm²] | strength [MPa] | tion [‰] |
| 1 | Bitumen 1 + 2.5% b.w. of polymer of dispersion 1 (F) | 2.355 | 100.1 | 2.2 | 5.4 | 0.08 | −21.7 | 4.526 | | |
| 2 | Bitumen 1 + 3.0% b.w. of polymer of dispersion 1 (F) | 2.347 | 100.6 | 2.4 | 5.9 | 0.10 | −21.5 | 4.341 | 4.931 | 0.458 |
| 3 | Bitumen 1 + 3.5% b.w. of polymer of dispersion 1 (F) | 2.330 | 100.3 | 1.6 | 3.9 | 0.04 | −22.8 | 4.620 | | |
| 4 | Bitumen 1 + 3.0% b.w. of polymer of dispersion 2 (F) | 2.322 | 100.4 | 1.6 | 3.8 | 0.03 | −23.1 | 4.078 | | |
| Comp 1 | Bitumen 1 | 2.625 | 99.6 | >10 | >20 | >1 | −27.6 | 3.674 | 4.533 | 0.728 |
| Comp 2 | Bitumen 2 | 2.332 | 100.4 | 2.6 | 6.2 | 0.10 | −21.7 | 3.886 | 4.601 | 0.411 |
| Comp 3 | Bitumen 1 (F) | 2.351 | 100.2 | 6.4 | 15.6 | 0.32 | −23.9 | 4.026 | | |
| Comp 2 | Bitumen 2 (F) | 2.343 | 99.9 | 3.8 | 9.3 | 0.21 | −21.2 | 4.006 | | |

F = foamed bitumen

The invention claimed is:

1. A process for the preparation of a foamed polymer-modified bitumen composition comprising the steps:

i) heating and pressurizing a bitumen to obtain a hot flowing bitumen stream;

ii) injecting under pressure an aqueous polymer dispersion into the hot flowing bitumen stream obtained in step i), to obtain a pressurized hot flowing mixed stream of the bitumen and the aqueous polymer dispersion;

iii) expanding the flowing mixed stream, such that at least a majority of the water contained in the aqueous polymer dispersion vaporizes and foams the mixed stream to obtain a foamed polymer-modified bitumen;

wherein a vulcanizing agent is injected into the flowing bitumen stream concomitantly with the aqueous polymer dispersion.

2. The process according to claim 1, where the amount of aqueous polymer dispersion, which is injected into the flowing bitumen stream, is such that the amount of water in the pressurized flowing mixed stream is in the range from 0.5 to 8.0% by weight, based on the total weight of the bitumen.

3. The process according to claim 1, where the amount of aqueous polymer dispersion injected into the flowing bitumen is such that the resulting amount of polymer of the polymer dispersion in the flowing mixed stream is in the range from 0.5 to 7.0% by weight, based on the total weight of the bitumen, results.

4. The process according to claim 1, wherein the aqueous polymer dispersion is an aqueous dispersion of butadiene-styrene copolymer.

5. The process according to claim 4, wherein the butadiene-styrene copolymer, the weight ratio of styrene to butadiene is in the range from 20:80 to 80:20.

6. The process according to claim 1, wherein the water, which is introduced into the flowing bitumen stream by injecting the aqueous polymer dispersion contributes at least 20% to the total amount of water contained in the flowing mixed bitumen stream prior to the expansion of step iii).

7. The process according to claim 1, where in step i) the bitumen is heated to a temperature of at least 105° C.

8. The process according to claim 1, where in step i) the bitumen is pressurized to a pressure of at least 1 bar above the atmospheric pressure.

9. The process according to claim 1, wherein the polymer dispersion is injected into the flowing bitumen in a mixing chamber to obtain the pressurized flowing mixed stream, which is discharged from the mixing chamber through an orifice and thereby expanded.

10. The process according to claim 1, wherein the step ii) is performed without dynamic mixing.

11. The process according to claim 1, wherein the aqueous polymer dispersion is injected into the flowing bitumen stream at an angle of >90°, with respect to the flow direction of the flowing bitumen stream.

12. The process according to claim 1, where the amount of aqueous polymer dispersion, which is injected into the flowing bitumen stream, is such that the amount of water in the pressurized flowing mixed stream is in the range from 1.0 to 5.0% by weight, based on the total weight of the bitumen.

13. The process according to claim 1, where the amount of aqueous polymer dispersion injected into the flowing bitumen is such that the resulting amount of polymer of the polymer dispersion in the flowing mixed stream is in the range from 1.0 to 5.0% by weight, based on the total weight of the bitumen, results.

14. The process according to claim 1, where in step i) the bitumen is heated to a temperature in the range from above 110 to 230° C.

15. The process according to claim 1, wherein in step iii) the flowing mixed stream is expanded to atmospheric pressure.

* * * * *